June 16, 1964     A. A. BLASKA     3,137,609

DECORATIVE MATERIAL

Filed May 4, 1959

United States Patent Office 3,137,609
Patented June 16, 1964

3,137,609
DECORATIVE MATERIAL
Alexander A. Blaska, South Amboy, N.J., assignor to Celanese Corporation of America, New York, N.Y., a corporation of Delaware
Filed May 4, 1959, Ser. No. 810,913
2 Claims. (Cl. 161—2)

This invention relates to composite decorative materials and more particularly to textile-patterned resinous materials and to a method of preparing such materials.

Transparent resinous composite sheets having decorative material laminated therein have been prepared in the past and have found use in the manufacture of articles such as eyeglass frames and handbags. Where textiles have been selected as the decorative material it has been possible to laminate only those textiles which have lace patterns or other open weave patterns. When it is attempted to laminate tightly woven textile materials in transparent resinous sheets there are difficulties because of the entrapment of air bubbles and because of the poor cohesion between the textile material and the resinous material.

It is an object of this invention to produce composite decorative resinous sheets having closely woven textile patterns. Other objects will appear hereinafter.

The objects of this invention are achieved by preparing a composite decorative material comprising an overlay sheet of a transparent thermoplastic material bonded at its undersurface to the upper surface of a thermoplastic supporting sheet, said undersurface being embossed in the pattern of a textile material and containing coloring material in its embossed pattern. The composite decorative material of this invention is prepared by embossing the surface of a transparent thermoplastic sheet with a textile-patterned material, stripping said textile-patterned material from said resinous sheet, applying a thin layer of colored material to said embossed surface and thereafter bonding a thermoplastic supporting sheet to said embossed surface.

Figure 1:
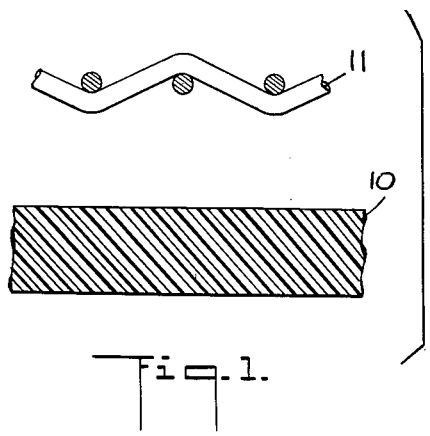

In a specific embodiment, described with reference to the accompanying FIGURES 1 to 4, a 20 gauge sheet of cellulose acetate, plasticized with 20 parts of diethyl phthalate and 15 parts of triphenyl phosphate per 100 parts of cellulose acetate, was used as the transparent thermoplastic sheet and a linen-like fabric having 45 ends of warp and 37 picks of filling per inch was used to provide the textile pattern. FIGURE 1 shows a cross sectional view of a small segment of the sheet 10 and of the fabric 11, with the fabric pattern exaggerated for clarity.

Figure 2:
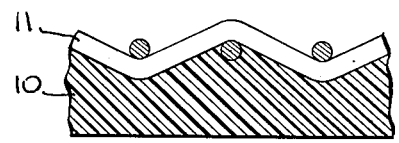

The textile fabric and the acetate sheet were placed together in an embossing press and subjected to a uniform pressure of about 300 p.s.i.g. at a temperature of about 280° F. for a period of about 45 minutes. The fabric became partially embedded in the acetate sheet and embossed its pattern therein, as shown in FIGURE 2.

The acetate sheet and fabric were then removed from the embossing press and the fabric was stripped away from the cellulose acetate sheet by hand.

A colored dope solution was prepared by dissolving 25 parts by weight of colored cellulose acetate sheet in 48.5 parts of ethylene glycol monomethyl ether and 26.5 parts of acetone. The cellulose sheet was transparent and smoke colored and was prepared by extruding 3 grains of carbon black, 0.82 grain of phthalocyanine blue and 2.52 grains of alizarin purple lake with each pound of cellulose acetate mix (plasticized as the 20 gauge sheet described above).

The colored dope solution was applied to the embossed surface by wiping it with a squeegee. The wiping was done in such a manner that the dope adhered to the depressed portions thereof. The dope sheet was air dried at a temperature of about 77° F. over a period of 24 hrs. A cross sectional view of the embossed cellulose acetate sheet after removal of the textile material and application of the dope is shown in FIGURE 3, with the dried dope layer designated as 12.

Figure 3:
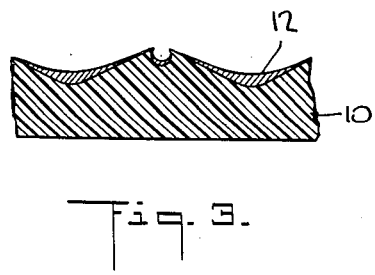

The embossed and colored sheet of FIGURE 3 was then laminated to a rigid supporting sheet of clear crystal cellulose acetate of 160 gauge, plasticized as described above. A spray of a cellulose acetate cement consisting of 95 weight percent of ethylene glycol monomethyl ether acetate and 5 weight percent of methyl phthalate was applied to both of the surfaces to be laminated to each other and permitted to dry for one half hour at room temperature. The lamination was then performed between the platens of a laminating press by the application of a pressure of about 300 p.s.i.g. and a temperature of 310° to 316° F. for a period of about 55 to 60 minutes.

The use of the cellulose acetate cement permits softening of the plastic at the surfaces at a lower temperature to lessen the danger of distortion of the sheets. Cellulose acetate cements contain a minor proportion (generally less than 10%) of a cellulose acetate plasticizer, such as dimethyl, diethyl or dibutyl phthalate, triacetin or triethyl citrate, and a major proportion of a solvent for the plasticizer and a partial solvent for the cellulose acetate, such as ehylene glycol monomehyl ether and its acetate, dioxane, methyl ethyl ketone and mixtures. Application of the cement by spraying followed by room temperature drying of most of the solvent results in penetration of the surfaces by plasticizer with the resulting lowering of softening point.

Figure 4:
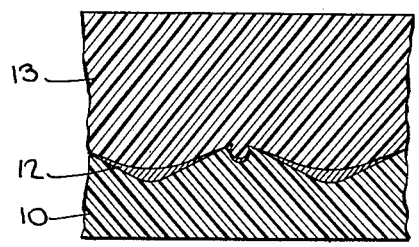

The final laminated material, shown in FIGURE 4 with the supporting sheet designated as 13, was attractive and uniform in appearance and was indistinguishable in appearance when viewed through sheet 10 from what a composite sheet would look like if the closely woven fabric used for embossing were actually laminated therein.

It is to be understood that numerous modifications may be made from the above specific description without departing from the scope of this invention. The thermoplastic embossed sheet need not be cellulose acetate, as described above, but may be another cellulose derivative, such as cellulose propionate, cellulose butyrate, or ethyl cellulose, or it may be a non-cellulosic thermoplastic resin, such as a polymer or copolymer of vinyl acetate, vinyl chloride, vinyl butyral, methyl methacrylate and styrene. If desired, the embossed sheet may be transparent and tinted rather than transparent and clear.

Instead of embossing the textile pattern in an embossing press and then stripping by hand, the embossing and stripping may be done continuously by pressing a moving sheet of thermoplastic material against a rotating roller covered with a textile-patterned material. In most cases, the textile-patterned material will be a textile, as in the above example.

The temperature, pressure and period of embossing depend largely on the nature of the thermoplastic material being embossed and to a lesser degree on the depth of embossing desired which is dependent on the character of the textile fabric to be reproduced. For cellulose acetate sheet, the preferred temperatures are between about 270° F. and 300° F. the pressures between about 200 and about 400 p.s.i.g. and the periods between about 40 and about 60 minutes.

Obviously, the coloring matter applied to the embossed surface need not represent the same color as the fabric from which the textile pattern was derived. Any transparent or opaque coloring material may be used. Or, if desired, a material such as natural pearl essence may be included to produce a "pearlized" effect at the embossed surface.

The coloring matter need not be dispersed in a dope or solution of the thermoplastic material of the embossed sheet. It may be dispersed in any material which produces an adherent deposit on the embossed sheet.

The coloring matter may be wiped into the embossed surface so that it is applied to only the depressed proportions thereof or it may be applied, as by a brush, to cover the entire embossed area. If desired, one coloring dope may be applied to the depressed portions of the embossed surface and another coloring dope applied to the remainder of the surface after the first has dried, to produce an attractive two-tone effect.

The supporting sheet may be either transparent or opaque depending on the effect desired. The supporting sheet may be either rigid or flexible depending on the use to which the decorative material is to be put.

The lamination step, in general, is carried out under the same conditions that lamination would be carried out if the embossed sheet were not embossed and not colored. If desired, the supporting sheet may be fabricated during the lamination step from a plurality of thinner sheets by stacking the thinner sheets and the embossed sheet in a laminating press and bonding all of the sheets together at the same time.

The conditions used in lamination depend largely on the nature of the thermoplastic materials used in the embossed sheet and in the supporting sheet and the thickness of the sheets and to a lesser extent on the depth of the embossed pattern. For cellulose acetate sheets the preferred temperature is between about 300° and 320° F. the preferred pressure is between about 200 and 600 p.s.i.g. and the preferred period is between about 45 and 60 minutes.

The decorative materials of this invention reproduce textile patterns so precisely that each individual yarn of the fabric may be seen in the pattern as it loops about the yarns lying in other directions. The contours of each yarn are visible in the reproduced pattern so that the light and shadow of each yarn in the reproduced pattern presents a three dimensional replica of the light and shadow of the yarn in the original textile. The minor irregularities in yarn spacing and yarn thickness which are characteristic of textile materials are also reproduced in the pattern so that the effect is extremely realistic.

It is to be understood that the foregoing detailed description is merely given by way of illustration and that many variations may be made therein without departing from the spirit of my invention.

Having described my invention what I desire to secure by Letters Patent is:

1. A composite decorative article, comprising a two-ply laminate having smooth and uninterrupted outer surfaces, said laminate being formed of a transparent first thermoplastic layer embossed on its inner surface in a relatively fine tightly woven textile yarn pattern and containing in said pattern a coloring material, and a second thermoplastic layer bonded along its inner surface to said first layer to provide an article wherein said colored pattern is visible through said first layer and simulates a structure in which the physical source for said pattern is actually contained therein, said pattern in cross-section being comprised of transversely and longitudinally spaced reappearing gently sloping valleys and relatively shallow concave pockets spaced from said valleys, said valleys at the bottom thereof containing a relatively large quantity of coloring material which diminishes in tapered configuration along the slopes of said valleys toward said pockets wherein there is contained a quantity of coloring material less than in the bottom of said valleys but more than at the peak of said slopes, thereby producing light effects in the form of deep shadows in the bottoms of said valleys, intermediate shadows in said pockets, and light shadows on the peak of said slopes, whereby there is obtained a precise visible reproduction of the physical source for said textile pattern.

2. A method of making a composite decorative article having smooth and uninterrupted outer surfaces, which comprises embossing with a relatively fine tightly woven textile yarn patterned material the inner surface of a transparent first thermoplastic layer, removing said patterned material from said embossed inner surface and applying a solvent-base colorant thereto, and laminating to said colored embossed surface a second thermoplastic layer while evaporating said solvent to provide an article wherein said colored pattern is visible through said first layer and simulates a structure in which the physical source for said pattern is actually contained therein, said pattern in cross-section being comprised of transversely and longitudinally spaced reappearing gently sloping valleys and relatively shallow concave pockets spaced from said valleys, said valleys at the bottom thereof containing a relatively large quantity of coloring material which diminishes in tapered configuration along the slopes of said valleys toward said pockets wherein there is contained a quantity of coloring material less than in the bottom of said valleys but more than at the peak of said slopes, thereby producing light effects in the form of deep shadows in the bottoms of said valleys, intermediate shadows in said pockets, and light shadows on the peak of said slopes, whereby there is obtained a precise visible reproduction of the physical source for said textile pattern.

References Cited in the file of this patent

UNITED STATES PATENTS

| | | |
|---|---|---|
| 1,947,459 | Casto | Feb. 20, 1934 |
| 1,969,273 | Neidich | Aug. 7, 1934 |
| 1,985,480 | Carpenter | Dec. 25, 1934 |
| 2,079,604 | Dickie et al. | May 11, 1937 |
| 2,133,081 | Colvin | Oct. 11, 1938 |
| 2,496,122 | Donahue | Jan. 31, 1950 |
| 2,524,811 | Koberlein | Oct. 10, 1950 |
| 2,585,915 | Chavannes | Feb. 19, 1952 |
| 2,587,594 | Chavannes | Mar. 4, 1952 |
| 2,601,460 | Salvin | June 24, 1952 |
| 2,606,855 | Jenkins | Aug. 12, 1952 |
| 2,714,559 | Sheffield et al. | Aug. 2, 1955 |
| 2,776,451 | Chavannes | Jan. 8, 1957 |
| 2,776,452 | Chavannes | Jan. 8, 1957 |
| 2,842,028 | Belgard | July 8, 1958 |
| 2,861,372 | Hunt | Nov. 25, 1958 |

FOREIGN PATENTS

| | | |
|---|---|---|
| 565,708 | Great Britain | Nov. 23, 1944 |